United States Patent
Chen et al.

(10) Patent No.: US 8,530,907 B2
(45) Date of Patent: Sep. 10, 2013

(54) ROOM TEMPERATURE SILICON-COMPATIBLE LED/LASER WITH ELECTRICALLY PUMPED FIELD EMISSION DEVICE

(75) Inventors: Jianxiao Chen, San Diego, CA (US); Charles H. Cox, Carlisle, MA (US)

(73) Assignee: Photonic Systems, Inc., Billerica, MA (US)

( * ) Notice: Subject to any disclaimer, the term of this patent is extended or adjusted under 35 U.S.C. 154(b) by 274 days.

(21) Appl. No.: 13/172,544

(22) Filed: Jun. 29, 2011

(65) Prior Publication Data

US 2012/0001543 A1 Jan. 5, 2012

Related U.S. Application Data (60) Provisional application No. 61/398,628, filed on Jun. 30, 2010.

(51) Int. Cl.
*H01L 27/15* (2006.01)

(52) U.S. Cl.
USPC ............ 257/79; 257/76; 257/65; 257/13; 257/86; 313/336; 445/50

(58) Field of Classification Search
USPC ............ 257/10, 13, 15, 54, 63, 65, 76, 77, 257/79, 86; 313/498, 336, 346; 445/50, 445/51
See application file for complete search history.

(56) References Cited

U.S. PATENT DOCUMENTS

| | | | | |
|---|---|---|---|---|
| 6,274,887 | B1 * | 8/2001 | Yamazaki et al. | 257/72 |
| 6,570,305 | B1 * | 5/2003 | Urayama et al. | 313/311 |
| 6,629,869 | B1 * | 10/2003 | Kumar et al. | 445/24 |
| 6,853,127 | B1 * | 2/2005 | Eccleston et al. | 313/495 |
| 7,358,658 | B2 * | 4/2008 | Sung | 313/497 |
| 2010/0039022 | A1 * | 2/2010 | Naum et al. | 313/495 |

OTHER PUBLICATIONS

Liu, et al., Tensile-Strained, N-type Ge as a Gain Medium for Monolithic Laser Integration on Si, Optics Express, Sep. 3, 2007, pp. 11272-11277, vol. 15, No. 8, Optical Society of America.
Cheng, et al., Room Temperature 1.6um Electroluminescence From Ge Light Emitting Diode on Si Substrate, Optics Express, Jun. 8, 2009, pp. 10019-10024, vol. 17, No. 12, Optical Society of America.
Hunt, et al., Structure and Electrical Characteristics of Silicon Field-Emission Microelectronic Devices, IEEE Transactions on Electron Devices, Oct. 1991, pp. 2309-2313, vol. 38, No. 10, IEEE.
Ding, Field Emission From Silicon, Jun. 2001, Massachusetts Institute of Technology, Cambridge, MA, US.
Park, et al., Lateral Field Emission Diodes Using SIMOX Wafer, IEEE Transactions on Electron Devices, Jun. 1997, pp. 1018-1021, vol. 44, No. 6, IEEE.

* cited by examiner

*Primary Examiner* — Haiss Philogene
(74) *Attorney, Agent, or Firm* — Kurt Rauschenbach; Rauschenbach Patent Law Group, LLC

(57) ABSTRACT

A light source includes a hot electron source comprising a cathode that generates an electron beam and an anode comprising a germanium containing material positioned adjacent to the cathode. The anode is biased so that the electron beam accelerates towards the anode where some electrons are absorbed and then relax to both direct energy bands and indirect energy bands causing stimulation of low energy electrons from the indirect energy band to the direct energy band, thereby creating electroluminescence.

26 Claims, 5 Drawing Sheets

ROOM TEMPERATURE SILICON-COMPATIBLE LED/LASER WITH ELECTRICALLY PUMPED FIELD EMISSION DEVICE

CROSS-REFERENCE TO RELATED APPLICATIONS

The present application is a non-provisional of copending United States Provisional Patent Application entitled "Room Temperature Silicon-Compatible Nano-LED/Laser Electrically Pumped by Field Emission Device," Ser. No. 61/398, 628, filed on Jun. 30, 2010. The entire contents of U.S. Patent Application Ser. No. 61/398,628 are incorporated herein by reference.

The section headings used herein are for organizational purposes only and should not to be construed as limiting the subject matter described in the present application in any way.

INTRODUCTION

Silicon device fabrication has been refined over many decades. Silicon device dimensions have steadily decreased over the decades and integration and device density has steadily increased. The cost of manufacturing silicon electronic devices has significantly decreased and the sophistication of the device fabrication has significantly increased over the decades.

It is desirable to integrate electronic and photonic devices in a silicon substrate. In recent decades, silicon-compatible optoelectronic devices, such as silicon modulators and silicon photodetectors, have made significant advances. Such devices are now commonly used in high-speed optical communication systems and chip-level interconnects.

However, practical silicon compatible light sources have yet to be demonstrated. The technical challenges of producing a silicon compatible light source are well known. Silicon is an indirect bandgap material. Therefore, the minimal-energy state in the conduction band and the maximal-energy state in the valence band have different k-vectors in the Brillouin zone. For radiative recombination to occur in silicon, the process must also involve the absorption or emission of a phonon, where the phonon momentum equals the difference between the electron and hole momentum. The necessity of the phonon makes the radiative recombination process much less likely to occur in a given span of time. Consequently, radiative recombination is far slower in indirect band gap materials like silicon than direct band gap materials, which makes such materials poor light emitters. This is why known light-emitting and laser diodes are almost always formed of direct band gap materials.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The person skilled in the art will understand that the drawings, described below, are for illustration purposes only. The drawings are not necessarily to scale, emphasis instead generally being placed upon illustrating principles of the teaching. The drawings are not intended to limit the scope of the Applicants' teaching in any way.

DESCRIPTION OF VARIOUS EMBODIMENTS

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teaching may be performed in any order and/or simultaneously as long as the teaching remains operable. Furthermore, it should be understood that the apparatus and methods of the present teaching can include any number or all of the described embodiments as long as the teaching remains operable.

The present teaching relates to silicon-compatible light-emitting diode (LED) and laser devices. The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

It is desirable for silicon-compatible light sources, such as lasers and light emitting diodes (LEDs), to have certain characteristics. First, it is desirable for the fabrication of the silicon compatible light source to be consistent with standard complementary metal oxide semiconductor (CMOS) processing. Second, it is desirable for the silicon compatible light sources to be electrically pumped rather than optically pumped, which requires another light source. Third, it is desirable for the silicon-compatible light source to emit an optical beam having a wavelength that is around 1.55 µm at room temperature in order for the light source to be useful in existing optical fiber communications systems.

There have been numerous attempts to fabricate a silicon compatible light source with these characteristics. See, for example, J. Liu, X. Sun, D. Pan, X. Wang, L. C. Kimerling, T. L. Koch, and J. Michel, "Tensile-Strained, n-type Ge as a Gain Medium for Monolithic Laser Integration on Si", Optics Express, Vol. 15, No. 18, pp 11272-7, September 2007. Researchers have attempted to fabricate light sources with such characteristics by using porous silicon, silicon nanocrystals, Er doped silicon, silicon nanostructures, silicon Raman lasers, and III-V semiconductor lasers grown on or bonded to silicon. Researchers have also attempted to fabricate light sources with such characteristics using silicon-germanium (SiGe) nanostructures and germanium tin (GeSn) nanostructures. However, thus far, researchers have not been able to successfully fabricate electrically pumped silicon compatible light sources that emit optical radiation at 1.55 µm at room temperature and that are compatible with standard CMOS processing.

Figure 1:
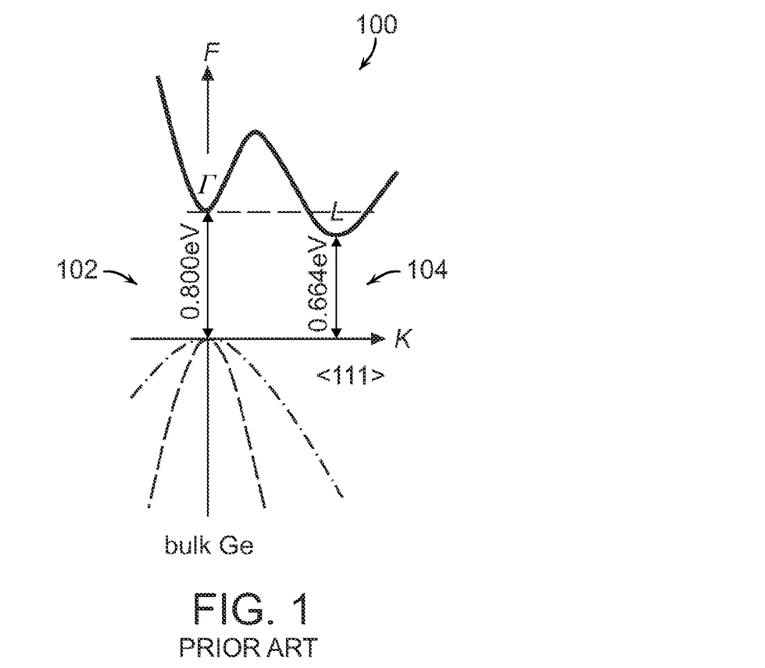
FIG. 1 illustrates the energy-momentum (E-K) characteristic of the germanium energy band structure.

FIG. 1 illustrates the energy-momentum (E-K) characteristics 100 of the germanium energy band structure. Germanium is a silicon process compatible material. It is well know that germanium exhibits pseudo-direct bandgap behavior. The direct bandgap 102 at the F valley is about 0.8 eV. The indirect bandgap 104 at L valley is 0.136 eV below the direct bandgap 102. Germanium is a particularly attractive material for fabricating silicon compatible light sources because the 0.8 eV direct bandgap 102 corresponds to an optical emission wavelength of 1.55 µm. It has been theoretically predicted that 0.25% tensile strained germanium transforms into a direct bandgap material if it is heavily n-doped at a $7.6 \times 10^{19}$ cm$^{-3}$ doping level because the L valley is band-filled by the high density electrons. Room temperature 1.6 µm electroluminescence was experimentally observed with a germanium n-doped device at a $7.5 \times 10^{18}$ cm$^{-3}$ doping level.

However, there are several disadvantages to using heavily n-type doped germanium for fabricating silicon compatible light sources. One disadvantage of using heavily n-type doped germanium for fabricating silicon compatible light sources is that the free electrons from the dopant have relatively low energy. Consequently, filing the conduction band from low to high energy states will have very low efficiency. Another disadvantage is that the heavy n-type doping of the germanium increases the non-radiative recombination rate from impurities which significantly reduces the radiative recombination rate. Another disadvantage is that the high density n-type dopants will suppress the local hole density at the valence band and consequently also reduce the radiative recombination efficiency. Conventional semiconductor lasers do not have these disadvantages because electrons and holes are injected and recombined in a junction having a relatively low doping level.

Silicon compatible light sources according to the present teaching include a hot electron source, for example, a cathode that emits electrons via field emission. One aspect of the present teaching is the use of field emission to pump electrons to a target material. Numerous types of target materials, such as a germanium containing materials like germanium thin films or SiGe supperlattice target materials, can be used. The field emission generates a large amount of high energy electrons from high energy states such as vacuum energy states, which improves the band filling efficiency. This method is in contrast to known methods of using germanium devices that use low energy electrons from heavy n-doping material. In one embodiment of the present teaching, a silicon field-emission device is used to generate a large amount of high energy electrons from vacuum energy states. The field-emission device can be a very small nanometer dimensioned field emission nano-tip having a critical dimension approximately in the range of about 1 to 100 nm. In some light sources according to the present teaching, the field-emission device has a nano-tip with a radius approximately in the range of about 1 to 10 nm.

The electrons are accelerated by an enhanced electric field at the nano-tip. The enhanced electric field can be expressed by the following equation $$E = \beta \frac{V}{d}$$

where V is the anode-cathode voltage, d is the spacing between the cathode tip and the anode, and β is the "field enhancement factor." For a parallel-plate field emission device, β is equal to 1. For field emission devices including a pointed cathode proximate to a planar anode, β is a function of the cathode radius of curvature at the point of emission. A typical value of β is equal to about 300. See, for example, C. E. Hunt, J. T. Trujillo, and W. J. Orvis, "Structure and Electrical Characteristics of Silicon Field-Emission Microelectronic Devices", IEEE Trans. Electron Devices, Vol. 38, No. 10, pp. 2309-13, October 1991.

The enhanced electric field assists the electrons in overcoming the surface potential and then escaping to vacuum where they become free electrons. The electron beam in the vacuum is then accelerated to the anode. A gate can be used to control the electron beam strength. The large amount of high energy electrons from vacuum energy states form an "electron rain" that fills the energy bands. When the electrons reach the intrinsic or doped target, they fill the direct band by two mechanisms. First, the high energy electrons directly relax to the direct conduction band. Second, electrons are stimulated from the low energy bands, such as the indirect band to the direct band. High efficiency electroluminescence is expected when the electrons in the direct band are accumulated at high density and then recombined efficiently with the holes at the valence band.

Figure 2:
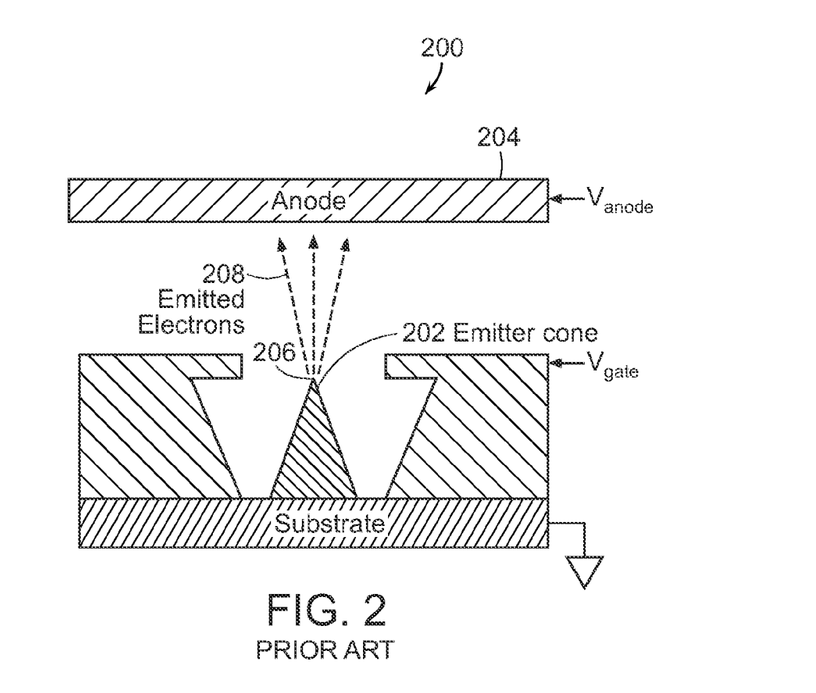
FIG. 2 illustrates a schematic view of a field emission device with a conical-shaped cathode and a planar anode.

FIG. 2 illustrates a schematic view of a field emission device 200 with a conical-shaped cathode 202 and a planar anode 204. The conical tip 206 of the cathode 202 has a radius of about 1-100 nm. Consequently, the electric field is enhanced by a factor of one hundred or more at the conical tip 206. The enhanced electric field assists the electrons in overcoming the surface potential so that the electrons escape to vacuum and then become free electrons forming an electron beam 208. The electron beam 208 in the vacuum is then accelerated towards the anode 204 where the electrons impact the anode material. A gate can be used to control the electron beam 208 in some devices.

Figure 3:
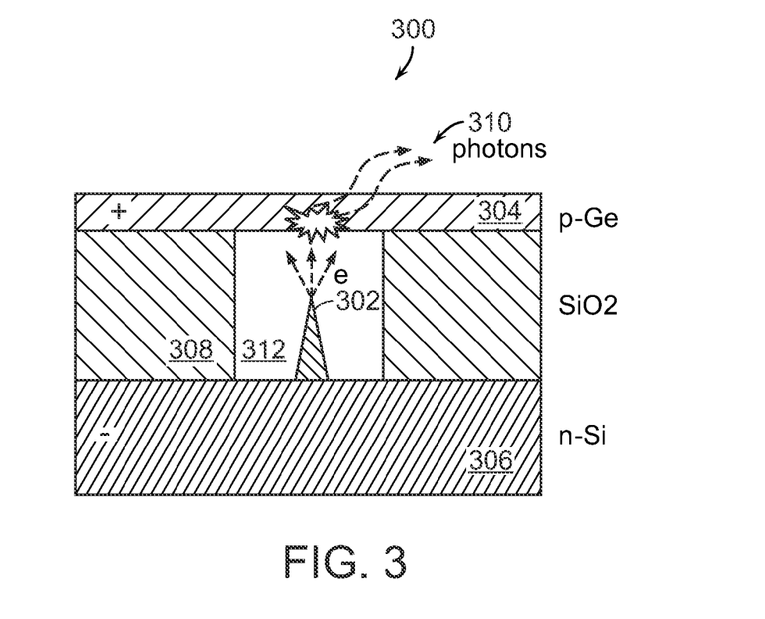
FIG. 3 illustrates a schematic view of a silicon compatible light source according to the present teaching including a field emission device with a conical-shaped silicon cathode and a planar anode comprising a germanium containing material.

FIG. 3 illustrates a schematic view of a silicon compatible light source 300 according to the present teaching including a field emission device with a conical-shaped silicon cathode 302 and a planar anode 304 comprising a germanium containing material. The conical-shaped silicon cathode 302 is formed on an n-type silicon substrate 306. However, it should be understood that numerous other types of field emission devices such as ones formed of metal or diamond can be used in the light sources according to the present teaching. The germanium containing material can be one of numerous types of materials, such as n-type germanium, p-type germanium, or a SiGe supperlattice structure. In the field emission device 300 shown in FIG. 3A, the germanium containing material is p-type germanium. There is a silicon dioxide layer 308 positioned between the n-type silicon substrate 306 and the p-type germanium layer 304. FIG. 3 illustrates a schematic view of germanium electroluminescence 310 resulting from electron pumping by the conical-shaped silicon cathode 302.

One skilled in the art will appreciate that there are numerous ways of fabricating the light source 300 with the conical-shaped silicon cathode 302 and the planar anode 304 according to the present teaching. For example, a conical-shaped silicon cathode 302 can be formed in the n-type silicon substrate 306 by anisotropic etching. It is well known that there are silicon etching processes which have etch rates that are strongly dependent upon the crystallographic orientation of the silicon. For example, wet etching chemistries, such as KOH etching chemistries, have etching rates that are strongly dependent upon the crystallographic orientation of the silicon that is exposed to the etchant. In one fabrication method, the tip area of the conical-shaped silicon cathode 302 is masked with photoresist or other masking material. The unmasked portion of the surface of the n-type silicon substrate 306 is exposed to an etching chemistry which selectively etches the n-type silicon substrate 306 to form the conical-shaped silicon cathode 302.

A silicon dioxide layer 308 or another type of dielectric material layer is grown on the n-type silicon substrate 306 with the selectively etched conical-shaped silicon cathode 302. A window 312 is then etched in the silicon dioxide layer 308 to expose the conical-shaped silicon cathode 302.

The planar anode 304 comprising the germanium containing material is formed on top of the silicon dioxide layer 308. In the embodiment shown, the germanium containing material is p-type germanium, but there are many other types of germanium containing materials that can be used, such as a SiGe supperlattice structure. In one fabrication method, the germanium containing material is bulk germanium containing material that is bonded on top of the silicon dioxide layer 308. In another fabrication method, the germanium containing material is grown on a silicon substrate and then the silicon substrate is bonded germanium side down onto the silicon dioxide layer 308. The resulting structure comprises a conical-shaped silicon cathode 302 positioned adjacent to the planar anode 304 comprising a germanium containing material.

Figure 4:
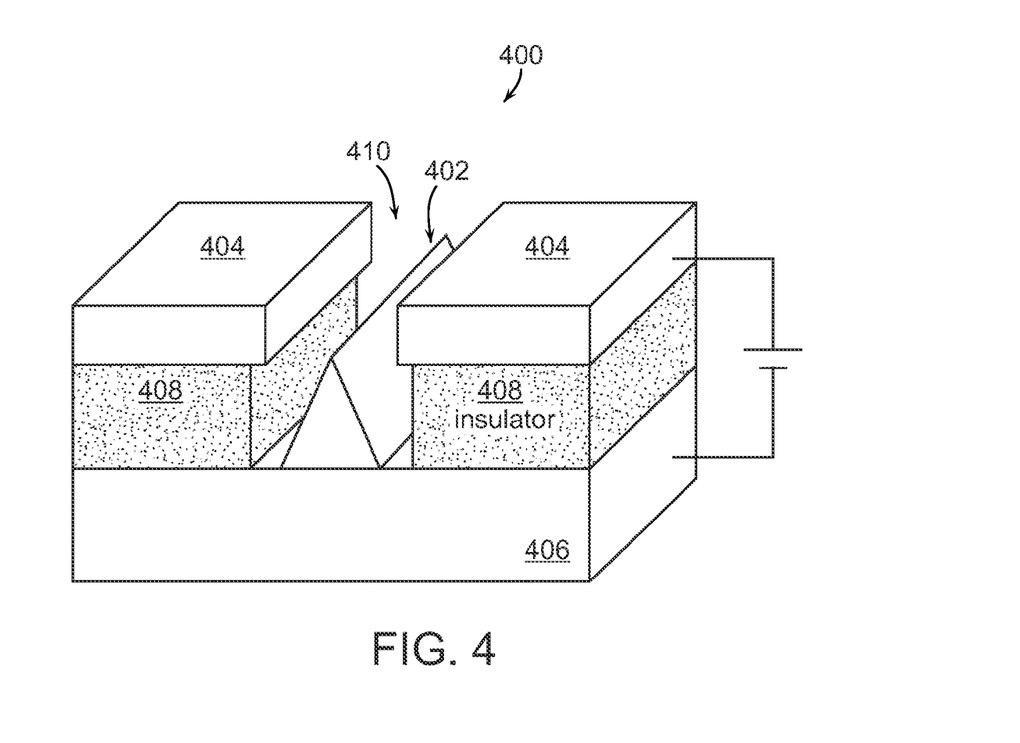
FIG. 4 illustrates a schematic view of a silicon compatible light source according to the present teaching including a field emission device with a ridge-shaped silicon cathode and a planar anode comprising a germanium containing material.

FIG. 4 illustrates a schematic view of a silicon compatible light source according to the present teaching including a field emission device 400 with a ridge-shaped silicon cathode 402 and a planar anode 404 comprising a germanium containing material. The ridge-shaped silicon cathode 402 is formed on a silicon substrate 406 by one of numerous wet or dry etching techniques. For example, the silicon substrate 406 can be an n-type silicon substrate. A dielectric material layer 408 is grown on the silicon substrate 406. The dielectric material layer 408 can be silicon dioxide or one of numerous other types of dielectric material. The anode 404 is then placed on the dielectric material 408 by a bonding or a growing technique. A window 410 is then formed in the anode 404 and the dielectric material 408. Alternatively, the window 410 is only formed in the dielectric material 408 and the anode 404 extends over the entire top surface of the device 400.

A conical-shaped silicon cathode, such as the cathode 302 shown in FIG. 3, is suitable for very small light sources, such as nano-sized light sources. However, there are many applications that require a larger electroluminescence area. For example, the ridge shape emitter 402 shown in FIG. 4 can be used to generate a line-shaped electroluminescence area. One skilled in the art will appreciate that numerous other types of shaped cathodes, such as wedge, ring, and thin film shaped cathodes can be used according to the present teaching.

In addition, larger electroluminescence areas can be achieved by using a plurality of field emission sources or a field emission tip array instead of a single tip or another single shaped field emission object. There are two orientations of field emission tips. That is, field emission tips can be oriented vertically or laterally relative to the anode.

Figure 5A:
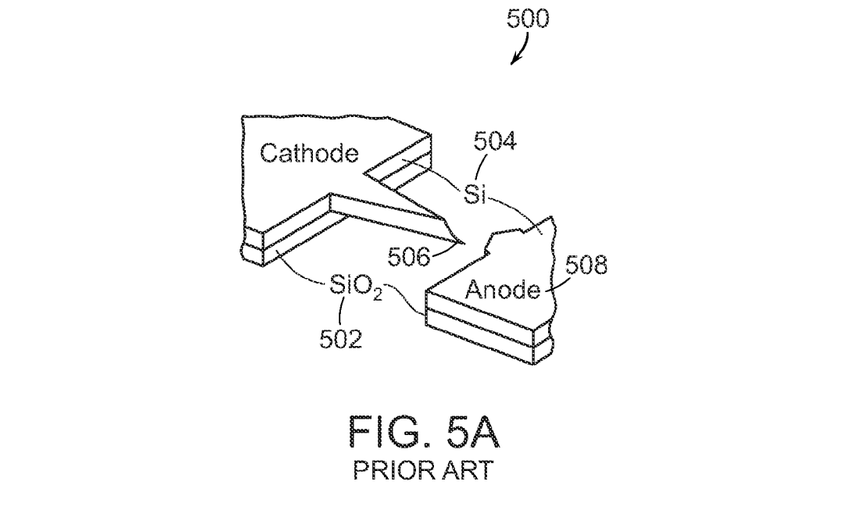
FIG. 5A illustrates a schematic view of a lateral field emission device formed of silicon-on-isolator.

FIG. 5A illustrates a schematic view of a lateral field emission device 500 formed of silicon on-isolator. A silicon dioxide layer 502 is formed over a silicon substrate 504. A field emission tip 506 is formed into the silicon 504 in the horizontal direction. An anode 508 is formed in the silicon substrate 504 adjacent to the field emission tip 506. In one example, the field emission tip 506 has a radius that is about 10 nm and it emits a 6 µA current at 35 V. See, for example, J. Park, H. Lee, H. Tae, J. Huh, and J. Lee, "Lateral Field Emission Diodes Using SIMOX Wafer", IEEE Trans. Electron Devices, Vol. 44, No. 6, pp. 1018-21, June 1997.

Figure 5B:
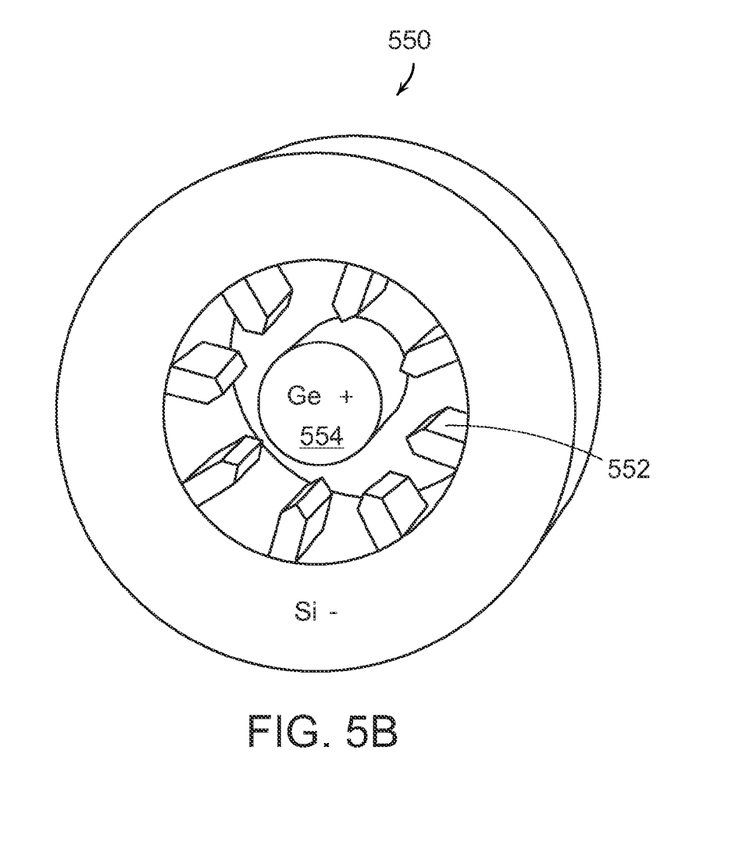
FIG. 5B illustrates a schematic view of a field emission device according to the present teaching with multiple lateral field emission tips positioned in the horizontal direction and arranged to surround a central anode.

FIG. 5B illustrates a schematic view of a field emission device 550 according to the present teaching with multiple lateral field emission tips 552 positioned in the horizontal direction and arranged to surround a central anode 554. In one embodiment, the multiple field emission tips 552 are silicon field emission tips. Also, in one embodiment, the anode 554 is a micro-pillar shaped anode formed of p-type germanium material that is positioned at the center of the field emission device 550.

The multiple silicon field emission tips 552 emit high energy electrons simultaneously that are directed to the central anode 554. The field emission device 550 can operate as a micro-cavity laser when the p-type germanium micro-pillar shaped anode dimensions satisfy a resonance condition for the desired emission wavelength and current is applied that is high enough to transform the p-type germanium to a gain medium.

The operation of the silicon compatible light sources described in connection with FIGS. 3, 4, and 5B is similar. A bias voltage is applied between the anode or anodes comprising germanium containing material and the silicon cathode. High energy electrons are emitted from the silicon cathode by field emission. The high energy electrons bombard the germanium containing material. Some of the high energy electrons are absorbed by the germanium containing material. The absorbed electrons relax both to the direct and to the indirect energy bands. Some of the electrons stimulate the low energy electrons from the indirect energy band to the direct energy band.

Figure 6:
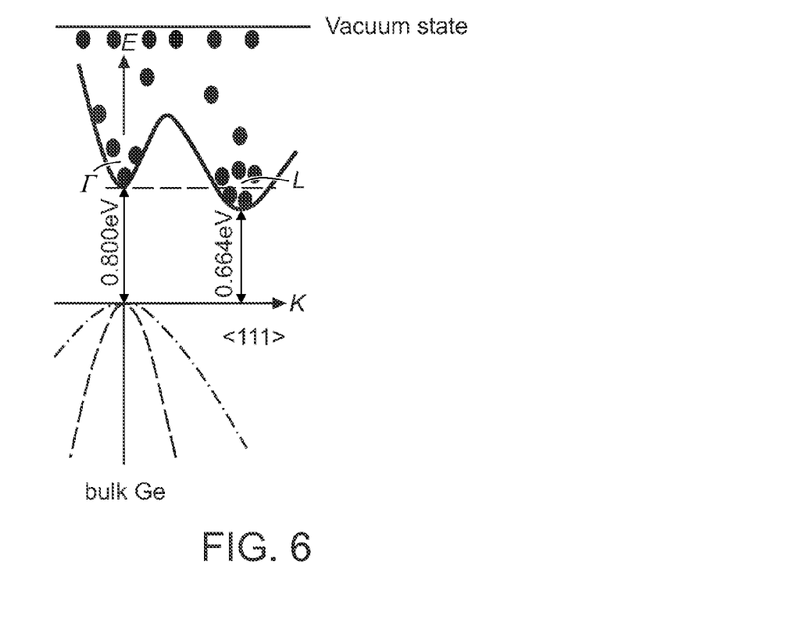
FIG. 6 illustrates a schematic diagram showing how the high energy electrons (hot electrons) relax to the F and L energy band valleys.

FIG. 6 illustrates a schematic diagram of the bulk germanium energy band structure 600 showing how high energy electrons relax to the energy band F and L valleys. When there is a sufficiently high electron density, the electrons and holes at the direct bandgap recombine and generate photons, thereby causing light emission. It has been theoretically estimated that germanium could become optically transparent when the injection carrier density is in the range of about 0.7 to $1.3 \times 10^{19}$ cm$^{-3}$. By optically transparent, we mean that the optical gain is equal to the optical loss. See, for example, C. E. Hunt, J. T. Trujillo, and W. J. Orvis, "Structure and Electrical Characteristics of Silicon Field-Emission Microelectronic Devices", IEEE Trans. Electron Devices, Vol. 38, No. 10, pp. 2309-13, October 1991.

The electron density can be estimated from the current density of the field emission. Experimental results have shown that one single silicon field emission tip with a radius of 1 nm can generate a 1.0 µA current when the bias voltage is 17 V and the distance between the anode and cathode is about 1.5 µm. When the germanium containing layer is positioned in close proximity to the field emission tip, the electrons are focused to a very small area that is on order of the dimensions of a circle having a radius that is equal to the radius of the field emission tip, which can be as short as only a few nanometers in length. The resulting local density of electron can be estimated using the following equation:

$$N = \frac{I}{\pi r^2} \frac{1}{qv} = \frac{1.0 \; \mu A}{3.14 \times 2^2 \; nm^2} \frac{1}{1.60 \times 10^{-19} C \times 1 \times 10^6 \; cm/s} = 5.0 \times 10^{19} \; cm^{-3}$$

where I is the current, r is the radius of the electron beam at the germanium surface, q is the charge of a single electron, and v is electron velocity, which is about $10^6$ cm/s. This estimation of the local density of electrons indicates that a high electron density can be built up locally, thereby transforming the germanium into a gain medium and enabling efficient electroluminescence at the local high density.

The potential energy of the field emission electrons generated from the germanium at the vacuum energy level states is about 4.0 eV, which is the electron affinity of germanium. The 4.0 eV potential energy is substantially higher than the potential energy of the germanium direct bandgap, which is about 0.8 eV. Impacting the germanium with such high energy electrons will result in a high probability of electrons causing energy transitions in the high energy conduction band rather than at the lowest direct bandgap. One aspect of the present teaching is the fabrication of a germanium containing material light source that includes an ultra-thin "electron brake" layer that is used to slow down the electrons. In some embodiments, the ultra-thin "electron brake" layer is a silicon layer that is few nanometers thick.

Figure 7A:
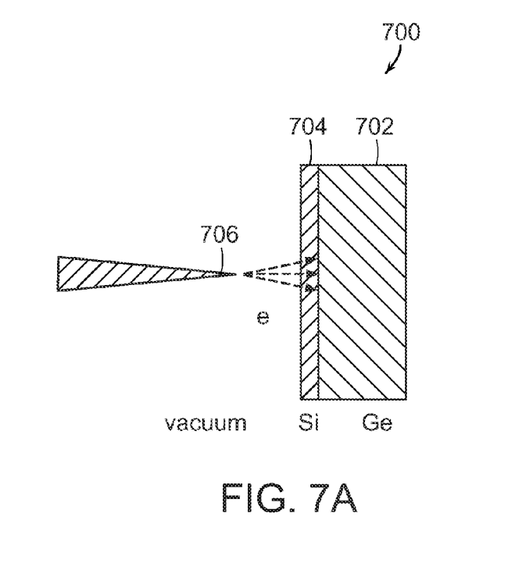
FIG. 7A illustrates a schematic diagram of a silicon compatible light source comprising a germanium containing material with an electron brake layer that slows down hot electrons according to the present teaching.

FIG. 7A illustrates a schematic diagram of a silicon compatible light source 700 comprising a germanium containing material 702 with an electron brake layer 704 that slows down hot electrons according to the present teaching. In one embodiment of the present teaching, the electron brake layer 704 is a silicon brake layer that is positioned directly on top of the germanium containing layer 702. High energy electrons are generated by the conical-shaped silicon cathode 706 in vacuum and these high energy electrons are directed to the electron brake layer 704. The high energy electrons then pass through the electron brake layer 704 where they lose some of their energy. The electrons then emerge from the electron brake layer 704 with a lower energy.

Figure 7B:
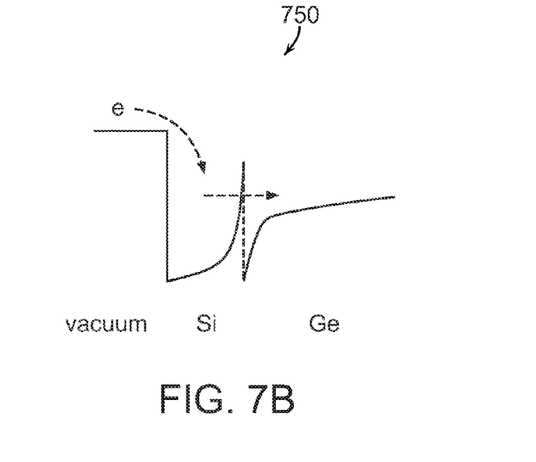
FIG. 7B illustrates a schematic view of an energy band structure showing the energy levels of the silicon compatible light source with an electron brake layer that slows down hot electrons according to the present teaching.

FIG. 7B illustrates a schematic view of an energy band structure showing the energy levels of the silicon compatible light source with an electron brake layer 704 that slows down hot electrons according to the present teaching. Referring to FIGS. 7A and 7B, when the hot electrons penetrate through the electron brake layer 704, they lose part of their energy. The material properties of the electron brake layer 704 and the thickness of the electron brake layer 704 are both chosen so that the energy of the electrons emerging from the electron brake layer 704 matches the germanium direct bandgap energy for the applied electric field. By carefully selecting the material properties and the thickness of the electron brake layer 704 and the magnitude of the applied electric field, electrons can emerge from the electron brake layer 704 with the desired energy that is equal to the direct bandgap of germanium. Consequently, if these conditions are met, there will be a high probability that the electrons will fill the lower direct bandgap and not cause energy transitions in the higher levels of the conduction band.

Field emission devices generally work best in a vacuum environment because the electrons being accelerated by the electric field in a vacuum environment gain the maximum available kinetic energy. However, in light sources according to the present teaching including anodes comprising germanium containing material, a vacuum is not necessary because the potential energy of the field emission electrons generated from the germanium at the vacuum energy level states is about 4.0 eV, which is substantially higher than the potential energy of the germanium direct bandgap (about 0.8 eV). In addition, using a package that maintains a vacuum for the field emission device unnecessarily adds to the cost. In light sources according to the present teaching, free space or a dielectric material can be positioned between the field emission device and the anode comprising the germanium containing material. That is, the field emission device can emit ballistic electrons into either a vacuum or into a dielectric material, such as silicon dioxide.

Figure 8A:
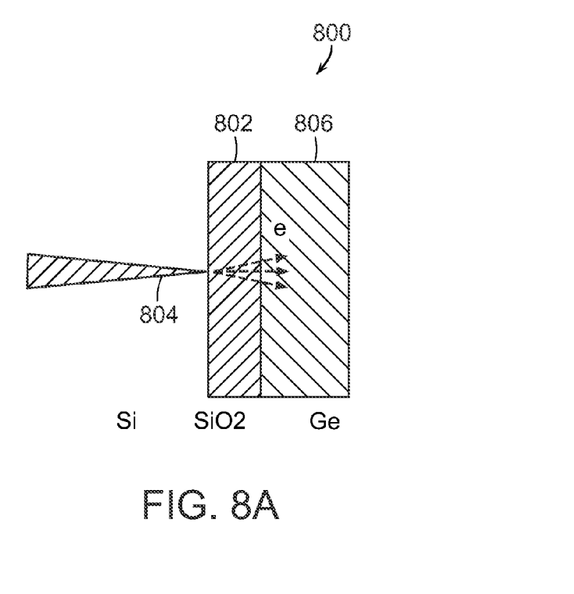
FIG. 8A illustrates a schematic diagram of a silicon compatible light source according to the present teaching that includes a dielectric material positioned between the field emission device and the anode comprising the germanium containing material.

FIG. 8A illustrates a schematic diagram of a silicon compatible light source 800 according to the present teaching that includes a dielectric material 802 positioned between a field emission device 804 and the anode 806 comprising the germanium containing material. For example, the dielectric material can be a thin silicon oxide layer. In operation, the electrons emitted from the field emission device are accelerated by a high electric field to the anode 806 comprising the germanium containing material. The electrons generated by the field emission device overcome the energy barrier presented by the dielectric film layer 802. If the energy of the electrons is high enough, the electrons tunnel directly through the dielectric film layer 802. For a silicon dioxide dielectric layer, the potential energy is almost equivalent to the vacuum energy state, so the tunneling electrons have high potential energy.

Figure 8B:
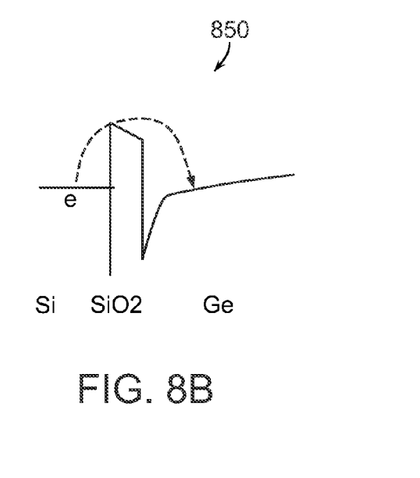
FIG. 8B illustrates a schematic view of an energy band structure showing the energy levels of the silicon compatible light source with dielectric material positioned between the field emission device and the anode that was described in connection with FIG. 8A.

FIG. 8B illustrates a schematic view of an energy band structure 850 showing the energy levels of the silicon compatible light source 800 with dielectric material positioned between the field emission device 804 and the anode 806 that was described in connection with FIG. 8A. The energy level diagram 850 shows the electrons generated by the field emission device 804 overcoming the energy barrier presented by the silicon dioxide dielectric film layer 802. If the silicon dioxide dielectric film layer is thin enough, the ballistic electrons will tunnel through the dielectric film layer.

The light source of the present teaching has numerous advantages over the prior art. One advantage of a light source according to the present teaching is that it is purely electrically pumped. Another advantage of a light source according to the present teaching is that it can operate at room temperature. Another advantage of a light source according to the present teaching is that it can emit optical radiation at 1.55 µm, which makes it useful for optical communication systems. In addition, another advantage of a light source according to the present teaching is that the light source can be fully CMOS compatible and, therefore, can be monolithically integrated into electronic circuits. Furthermore, the light source can be fabricated at a nano scale that is comparable to state-of the art MOSFET circuit dimensions. Such a small light source can be integrated with sub-micron Si optical waveguides. The resulting small area also helps to reduce the overall fabrication cost of the device. There are many applications for a light source according to the present teaching including use in many integrated electro-optic devices. One particular application is an integrated electro-optic device for short range chip-to-chip communications.

EQUIVALENTS

While the Applicants' teaching is described in conjunction with various embodiments, it is not intended that the Applicants' teaching be limited to such embodiments. On the contrary, the Applicants' teaching encompasses various alternatives, modifications, and equivalents, as will be appreciated by those of skill in the art, which may be made therein without departing from the spirit and scope of the teaching.

What is claimed is:

1. A light source comprising:
   a) a hot electron source comprising a cathode that generates an electron beam; and
   b) an anode comprising a germanium containing material positioned adjacent to the cathode, the anode being biased so that the electron beam accelerates towards the anode, some electrons in the electron beam are absorbed and then relax to both direct energy bands and indirect energy bands causing stimulation of low energy electrons from the indirect energy bands to the direct energy bands, thereby creating electroluminescence.

2. The light source of claim 1 wherein the cathode is formed of silicon.

3. The light source of claim 1 wherein the cathode comprises a metal.

4. The light source of claim 1 wherein the cathode comprises diamond.

5. The light source of claim 1 wherein the hot electron source comprises a conical-shaped cathode that generates a circular electroluminescence area.

6. The light source of claim 1 wherein the hot electron source comprises a wedge-shaped cathode that generates a line-shaped electroluminescence area.

7. The light source of claim 1 wherein the hot electron source comprises a plurality of hot electron sources, the anode comprising the germanium containing material being positioned adjacent to each of the plurality of hot electron sources.

8. The light source of claim 1 wherein the hot electron source comprises a conical-shaped cathode having a radius that is in the range of about 1 to 100 nm.

9. The light source of claim 1 wherein the hot electron source comprises a conical-shaped cathode having a radius that is in the range of about 1 to 10 nm.

10. The light source of claim 1 wherein the germanium containing material comprises p-type germanium.

11. The light source of claim 1 wherein the germanium containing material comprising at least one of n-type germanium and intrinsic germanium.

12. The light source of claim 1 wherein the germanium containing material comprises a SiGe supperlattice.

13. The light source of claim 1 further comprising a dielectric material positioned between the cathode and the anode wherein ballistic electrons in the electron beam tunnel through the dielectric material to the anode.

14. The light source of claim 1 further comprising an electron brake positioned between the cathode and the anode.

15. The light source of claim 14 wherein the electron brake comprises a silicon film.

16. The light source of claim 1 further comprising an electron gate that controls the electron beam generated by the cathode.

17. A method of generating light:
   a) generating an electron beam with a field emission cathode; and
   b) accelerating the electron beam towards an anode comprising a germanium containing material, wherein some electrons in the electron beam are absorbed and then relax to both direct energy bands and indirect energy bands causing stimulation of low energy electrons from the indirect energy bands to the direct energy bands, thereby creating electroluminescence.

18. The method of claim 17 further comprising tunneling at least some electrons in the electron beam through a dielectric material positioned between the field emission cathode and the anode comprising the germanium containing material.

19. The method of claim 17 further comprising reducing the energy of electrons in the electron beam using an electron brake positioned between the cathode and the anode.

20. The method of claim 17 further comprising gating the electron beam.

21. A light source comprising:
   a) an anode comprising a germanium containing material; and
   b) a plurality of field emission devices positioned around the anode, each of the plurality of field emission devices comprising a cathode that generates an electron beam directed towards the anode,
   the anode being biased so that the electron beams accelerate towards the anode where some electrons in the electron beams are absorbed and then relax to both direct energy bands and indirect energy bands causing stimulation of low energy electrons from the indirect energy bands to the direct energy bands thereby creating electroluminescence.

22. The light source of claim 21 wherein the plurality of field emission devices are laterally positioned relative to the anode.

23. The light source of claim 21 wherein the plurality of field emission devices comprise silicon cathodes.

24. The light source of claim 21 wherein the anode comprises a micro-pillar formed of germanium.

25. The light source of claim 24 wherein dimensions of the micro-pillar satisfy a resonance condition for a desired emission wavelength.

26. The light source of claim 25 wherein a current of the electron beams generated by the plurality of field emission devices is high enough to transform the p-type germanium into a gain medium.

* * * * *